March 4, 1958  J. J. SLOMER  2,825,490
LUBRICATING DEVICE
Filed Dec. 13, 1956
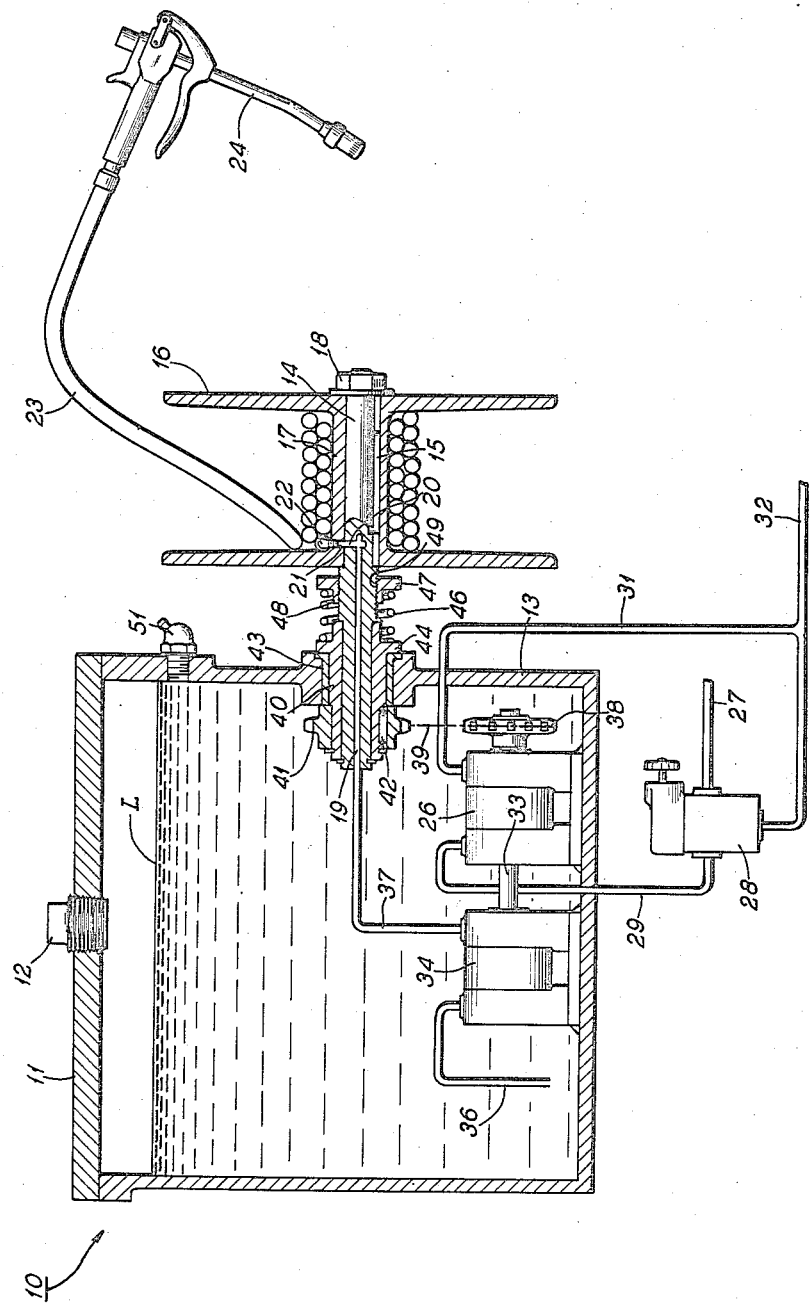
INVENTOR.
Joseph J. Slomer
BY
Murray A. Gleeson
ATTORNEY

United States Patent Office 2,825,490
Patented Mar. 4, 1958

2,825,490

LUBRICATING DEVICE

Joseph J. Slomer, Chicago, Ill., assignor to Goodman Manufacturing Company, Chicago, Ill., a corporation of Illinois Application December 13, 1956, Serial No. 628,144

2 Claims. (Cl. 222—74)

This invention relates generally to a lubricating device, and more particularly to an improved device wherein a lubricant supply hose can be stored readily when the device is not in use.

According to the present invention lubricant is supplied by a supply hose and a lubricant applying gun at the free end thereof, the supply hose being wound upon a storage reel which pays the hose readily therefrom when the lubricant applying gun is in a nonactuated position. A fluid operated motor and a lubricant pump driven thereby are operated according to the condition of the gun, and the storage reel maintains a winding tension upon the supply hose when lubricant is being supplied by the gun, and a limited tension is placed on the supply hose when it is payed from the storage reel so that the operator may readily maneuver the supply hose and the lubricant gun between applications of lubricant. The supply hose may accordingly be rewound upon the reel when the gun is applied at a lubrication point on a storage container for the lubricant disposed in close proximity to the storage reel.

With the foregoing considerations in mind it is a principal object of this invention to provide an improved lubricating device characterized by a lubricant supply hose having tension placed thereon both during operation of the gun and when it is payed from its storage reel.

Other objects and important features of the invention will be apparent from a study of the specification following taken with the drawing which together describe and illustrate a preferred embodiment of the invention and what is now considered to be the best mode of practicing the principles thereof. Other embodiments may be suggested to those having the benefit of the teachings herein, and such other embodiments are intended to be reserved especially as they fall within the scope of the subjoined claims.

The single figure of the drawing illustrates a preferred embodiment of a lubricating device according to the present invention.

Referring now to the drawing the lubricating device according to the present invention is indicated generally by the reference numeral 10 and includes a storage vessel 11 having a filler plug 12 located at the top thereof. The vessel 11 can be filled with grease or other lubricant at the filler plug 12 to any level L as desired.

A wall 13 of the vessel 11 provides a support for a hollow shaft 14 which in turn supports a storage reel 16 having a hub 17 fast upon the shaft 14 by a key 15 and a nut 18 as shown. The shaft 14 has a drilled passageway 19 therein which intersects a radial bore 20 in the shaft 14, and a radial bore 21 in hub 17. An elbow 22 is threaded at the bore 21 in hub 17 and is thereby connected with the drilled passageway 19. The other end of the elbow, not shown, is connected to a length of lubricant supply hose 23 which is wound upon the storage reel 16, the free end of the supply hose 23 having connected thereto a lubricant applying gun 24.

Means are provided for supplying lubricant under pressure to the drilled passageway 18 and in turn to the gun 24. Such means consists of a fluid operated motor 26 preferably disposed within the storage vessel 11. Fluid under pressure for driving the motor 26 is supplied at a pressure line 27, and an adjustable pressure reducing valve 28 having a working line 29 therefrom is connected to the fluid motor 26. Spent fluid from the motor 26 is exhausted by means of a line 31 connected to a tank line 32 leading from the adjustable pressure reducing valve 28.

A shaft 33 connects the fluid motor 26 to a lubricant supply pump 34 having an inlet line 36 thereto and a pressure outlet line 37 connected to the drilled passageway 19.

The fluid motor 26 is arranged to drive the storage reel 16 in a direction to wind the lubricant supply hose 23 thereon, and to this end the shaft 33 has a sprocket 38 thereon connected through a driving chain 39 to a driven sprocket 41 keyed at 42 to a sleeve bushing 40 surrounding the shaft 14 and turning within a bushing 43 held in the wall 13 of the vessel 11.

The sleeve bushing 40 affords part of means for drivably connecting the sprocket 41 to the shaft 14 to drive the storage reel 14. To this end the sleeve bushing 40 has a circular end flange 44 thereon disposed at the outer side of the wall 13 and having a coil spring 46 bearing thereagainst. The spring 46 is coiled about the shaft 14 and the other end thereof bears against a circular flange 47 having a hub 48 having inside threads 49 cooperating with mating threads on the shaft 14.

The load on the coil spring 46 can be adjusted according to the position of the flange 47, and it will be seen that the sprocket 41 can drive the shaft 14 and reel 16 to wind the supply hose 23 thereon at a torque limited by the setting of the coil spring 46. Conversely, the supply hose 23 can be payed from the storage reel 16 at a tension determined by the setting of spring 46.

When the gun 24 is not being operated, the lubricant pump 34 will be working against a back pressure in the line 37 connected to the passageway 19 and also the back pressure in the lubricant supply hose 23. This in turn will create a back pressure in the line 29 connecting the fluid motor 26 to the valve 28. The valve 28 is of a type which will maintain a desired pressure at the line 29.

While at such time the motor 26 will be stalled by the pressure against pump 34 and no longer will be driving the storage reel 16 in a direction to wind the hose 23 thereon, the hose 23 may be payed therefrom by the provision of spring type slip clutch described above. At such time the lubricant supply hose 23 can be payed from the storage reel 16, and the hose 23 and the lubricant gun 24 may be maneuvered to another lubricant fitting, not shown.

When the lubricant is supplied at such fitting, the pump 34 will supply lubricant and the motor 26 will turn both pump 34 and sprocket 41. At the same time the fluid motor 26 will drive the reel 16 in a take-up direction imposing at such time a desired amount of tension on the lubricant supply hose 23, the slip clutch described controlling the amount of such tension. It will be observed that the gun 24 and the supply hose 23 may be freely maneuvered whilst the storage reel 16 can pay the lubricant supply hose therefrom.

When the lubrication at a series of lubricating points remote from the storage reel 16 and the supply vessel 11 has been completed, the lubricant supply hose 23 can be readily stored upon the reel 16 by applying the gun 24 to a lubrication fitting 51 disposed at the vessel 11. As before, the actuation of the gun 24 at the fitting 42 will cause a winding operation of the reel 16 to wind the hose 23 thereon, and the operation described may be continued until the lubricant supply hose is completely wound upon the reel 16.

While the invention has been described in terms of a preferred embodiment thereof its scope is intended to be reserved only by the claims here appended.

I claim as my invention:

1. In a lubricating device, a vessel containing a supply of lubricant, a pump for lubricant having a supply line thereto connected to said supply of lubricant, a fluid operated motor for driving said lubricant pump, a storage reel for a length of lubricant pressure hose having a lubricant gun at the free end thereof, a yieldable driving connection between said fluid operated motor and said storage reel, a supply of pressure fluid for operating said motor, a valve connected in said supply for controlling the passage of pressure fluid to said motor, a connection between said valve and said motor, said motor being stalled by the back pressure against said pump when lubricant is not being supplied thereby, said lubricant pressure hose being adapted to be payed from said storage reel both during operation and stalling of said pump, and said storage reel being operable during operation of said fluid motor to wind lubricant hose thereon, and a lubricant fitting at said tank for attachment thereto of said lubricant gun to wind the lubricant hose on said storage reel.

2. In a lubricating device, a vessel containing a supply of lubricant, a pump for lubricant having a supply line thereto connected to said supply of lubricant, a fluid operated motor for driving said lubricant pump, a storage reel for a length of lubricant pressure hose having a lubricant gun at the free end thereof, a clutching connection between said fluid operated motor and said storage reel, a supply of pressure fluid for operating said motor, a valve connected in said supply for controlling the passage of pressure fluid to said motor, a connection between the input side of said fluid motor and said valve, said fluid motor and said pump being stalled when lubricant is not being supplied at said lubricant gun, said storage reel being adapted to pay lubricant hose therefrom during said stalled condition, and being operable during operation of said fluid motor to wind lubricant hose thereon or pay lubricant hose therefrom, and a lubricant fitting at said tank for attachment thereto of said lubricant gun to wind the lubricant hose on said storage reel.

No references cited.